C. BAILEY.
GRAIN REDUCING APPARATUS.

No. 190,180. Patented May 1, 1877.

WITNESSES:
INVENTOR:
C. Bailey.
BY
ATTORNEYS.

UNITED STATES PATENT OFFICE.

CYRUS BAILEY, OF AKRON, OHIO.

IMPROVEMENT IN GRAIN-REDUCING APPARATUS.

Specification forming part of Letters Patent No. 190,180, dated May 1, 1877; application filed March 24, 1877.

*To all whom it may concern:*

Figure 1:
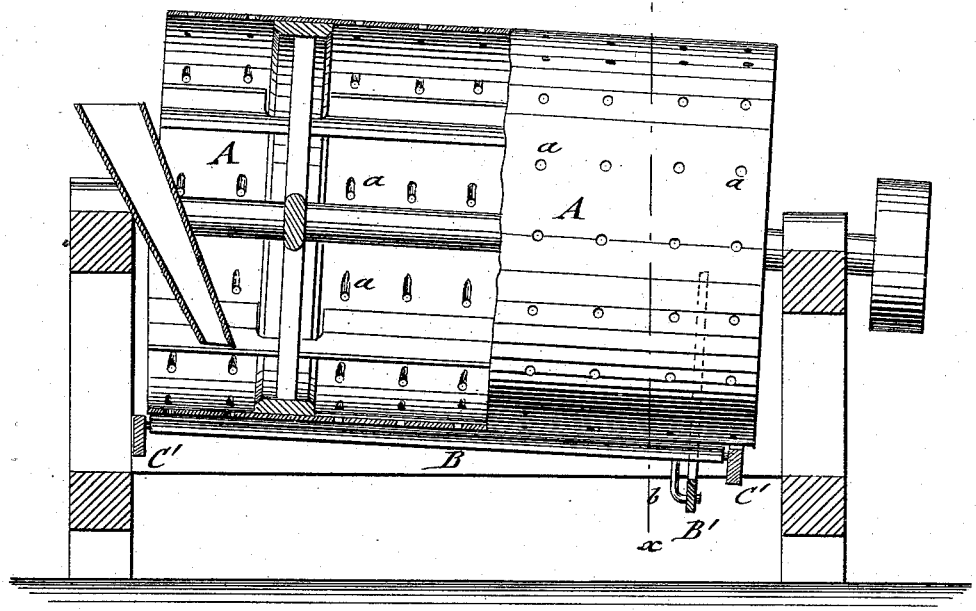
Figures 2, 3:
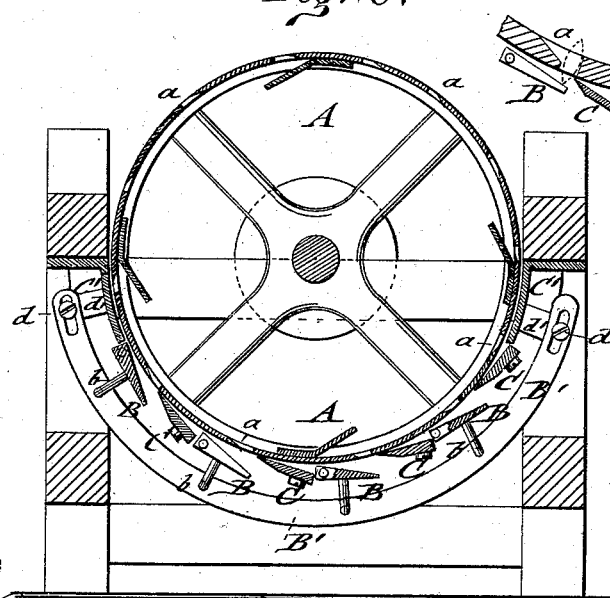

Be it known that I, CYRUS BAILEY, of Akron, in the county of Summit and State of Ohio, have invented a new and Improved Grain-Cutter, of which the following is a specification:

In the accompanying drawing, Figure 1 represents a side elevation, with part broken out, of my improved grain-cutter. Fig. 2 is a vertical transverse section of the same on line $x\ x$, Fig. 1; and Fig. 3, a detail vertical section of the cylinder.

Similar letters of reference indicate corresponding parts.

This invention is intended for the purpose of cutting oats or other grain into meal without producing any dust, admitting the cutting, on one machine, of different grades of meal in a superior and more marketable manner than with the rapidly-revolving crushing-rollers at present in use.

The invention consists of a perforated revolving cylinder or reel, that feeds the oats or other grain to fixed cutting-knives, regulating the length of the projecting kernel portions by adjustable guard-plates. The holes through which the oats or other grain are dropped are straight at the end toward the knife, and inclined or countersunk at the other end to carry the grain into position for cutting.

In the drawing, A represents a slowly-revolving cylinder or reel, that is supported in a suitable frame, being placed at a slight inclination to feed or "screw" the oats or other grain, that are supplied through a spout at the upper end, gradually and evenly through the cylinder, and pass any coarse grain or straws through the same and out at the lower end. The cylinder or reel is supported on radial arms of the shaft, and provided with holes $a$, into which the kernels settle to pass partly through the same and drop on guard-plates B, being then cut by fixed knives C. The holes or perforations $a$ are made, at the inside of the cylinder, of peculiar shape—namely, square or straight at the side toward the knives, and countersunk or tapering at the other side, as shown clearly in Fig. 3.

The kernel of grain passes gradually along the incline of the countersunk portion of the hole until it assumes a straight position along the straight side of the hole, and, being held plumb to the knife, is cut off squarely by the same. The shape of the holes prevents the kernel from falling through without being cut. The knives C are attached at both ends to an arc-shaped frame or supports C', extending around the lower part of the cylinder. The guard-plates B are arranged in front of the knives and pivoted at both ends to the supports C', the pivots being placed near the edge of the guards farthest from the cutting-edges of the knives. The pivoted guard-plates B are connected, by fixed rods or hooks $b$, with an arc-shaped band or plate, B', that may be adjusted, at the slotted ends, by clamping-screws $d$, to lugs $d'$ of the supports C'. The plate B' serves to raise or lower the guard-plates into different positions, in which they are secured by the end slots and clamp-screws, so as to admit the cutting of the different grades of meal by one machine; whereas in the machines at present in use one is required for each grade of meal.

The distance of the guard-plate B from the holes of the cylinder controls the size of the kernel portion cut off by the knives, as, by the guard-plates, the kernels are allowed to project to a greater or less extent from the cylinder. As the cylinder revolves, the holes clear themselves, as anything in them drops when they reach the top.

This cutting-machine produces no dust or flour at all which sells at less rate than the meal, nor any waste, the meal being directly ready for packing when coming from the machine, and superior to the meal crushed by the present method.

Having thus described my invention, I claim as new and desire to secure by Letters Patent—

1. A grain-cutting machine constructed of an inclined revolving cylinder or reel, having exit-holes for the grain, of adjustable guard-plates, and of fixed cutting-knives, all arranged and operated substantially as and for the purpose specified.

2. The combination of the pivoted guard-plates, having fixed rods or lugs, with the arc-shaped adjusting plate or band, secured by clamp-screws at the slotted ends, to regulate distance of guard-plates from cylinder for cutting different grades of meal, substantially as herein specified.

3. The revolving cylinder A, having exit perforations with straight ends toward the cutting-knives, and countersunk or tapering ends at the opposite sides, for the purpose herein specified.

CYRUS BAILEY.

Witnesses:
A. R. SHAFFER,
S. B. BAILEY.